(12) United States Patent
Hong et al.

(10) Patent No.: US 8,447,824 B2
(45) Date of Patent: May 21, 2013

(54) ENVIRONMENT INFORMATION PROVIDING METHOD, VIDEO APPARATUS AND VIDEO SYSTEM USING THE SAME

(75) Inventors: Joo-sun Hong, Suwon-si (KR); Baik-hee Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 533 days.

(21) Appl. No.: 12/015,637

(22) Filed: Jan. 17, 2008

(65) Prior Publication Data

US 2009/0031036 A1    Jan. 29, 2009

(30) Foreign Application Priority Data

Jul. 27, 2007 (KR) .................. 10-2007-0075586

(51) Int. Cl.
*G06F 15/16* (2006.01)
*H04L 12/26* (2006.01)

(52) U.S. Cl.
USPC ........... 709/208; 709/231; 709/225; 709/204; 370/399; 370/394; 370/235; 370/252; 370/233; 370/400; 370/466; 370/419; 370/230

(58) Field of Classification Search .................. 709/226, 709/231, 225, 204
See application file for complete search history.

(56) References Cited

U.S. PATENT DOCUMENTS

| | | | | |
|---|---|---|---|---|
| 4,771,344 A * | 9/1988 | Fallacaro et al. | ............... | 386/97 |
| 4,911,866 A * | 3/1990 | Monroe | .......................... | 261/81 |
| 4,987,706 A * | 1/1991 | Hughes et al. | .................. | 52/79.5 |
| 5,398,070 A * | 3/1995 | Lee | ................. | 348/553 |
| 5,543,857 A * | 8/1996 | Wehmeyer et al. | ............ | 348/589 |
| 5,551,920 A * | 9/1996 | Ogden et al. | ..................... | 472/59 |
| 5,724,256 A * | 3/1998 | Lee et al. | ...................... | 700/285 |
| 5,769,725 A * | 6/1998 | Ogden et al. | ..................... | 472/59 |
| 5,826,357 A * | 10/1998 | Hechler | ......................... | 40/428 |
| 5,832,320 A * | 11/1998 | Wittek | .......................... | 396/106 |
| 5,949,522 A * | 9/1999 | Manne | ......................... | 352/85 |
| 5,972,290 A * | 10/1999 | De Sousa | .......................... | 422/5 |
| 6,007,338 A * | 12/1999 | DiNunzio et al. | ............. | 434/55 |
| 6,076,638 A * | 6/2000 | Gertz | ........................... | 187/414 |
| 6,195,090 B1 * | 2/2001 | Riggins, III | .................. | 725/139 |
| 6,241,944 B1 * | 6/2001 | Budman | ........................... | 422/4 |
| 6,390,453 B1 * | 5/2002 | Frederickson et al. | ......... | 261/26 |
| 6,396,814 B1 * | 5/2002 | Iwamura et al. | .............. | 370/256 |
| 6,417,869 B1 * | 7/2002 | Do | ................. | 715/718 |
| 6,441,658 B1 * | 8/2002 | Taraci et al. | .................. | 327/147 |
| 6,577,808 B1 * | 6/2003 | Oestreicher et al. | ............ | 386/68 |
| 7,016,933 B2 * | 3/2006 | Glass et al. | ................... | 709/200 |
| 7,448,061 B2 * | 11/2008 | Richards et al. | ................ | 725/82 |
| 7,503,059 B1 * | 3/2009 | Rothschild | ..................... | 725/113 |
| 7,754,959 B2 * | 7/2010 | Herberger et al. | .............. | 84/626 |
| 2001/0036203 A1 * | 11/2001 | Yamaguchi et al. | .......... | 370/535 |
| 2002/0032868 A1 * | 3/2002 | Yamamoto et al. | ........... | 713/193 |

(Continued)

FOREIGN PATENT DOCUMENTS

| | | |
|---|---|---|
| JP | 2003-204449 A | 7/2003 |
| JP | 2005-279217 A | 10/2005 |
| WO | 2005/069640 A1 | 7/2005 |

*Primary Examiner* — Jude Jean Gilles
(74) *Attorney, Agent, or Firm* — Sughrue Mion, PLLC

(57) ABSTRACT

An environment information providing method, a video apparatus and a video system using the same are provided. The environment information is generated and inserted in between packets of a video stream. Accordingly, a user can watch the video in an environment similar to the reproduced video.

16 Claims, 5 Drawing Sheets

U.S. PATENT DOCUMENTS

| | | | |
|---|---|---|---|
| 2002/0114286 A1* | 8/2002 | Iwamura et al. | 370/252 |
| 2002/0114744 A1* | 8/2002 | Chiao et al. | 422/124 |
| 2002/0120935 A1* | 8/2002 | Huber et al. | 725/60 |
| 2002/0131511 A1* | 9/2002 | Zenoni | 375/240.28 |
| 2002/0157330 A1* | 10/2002 | Lee | 52/198 |
| 2003/0223428 A1* | 12/2003 | Blanquer Gonzalez et al. | 370/395.4 |
| 2004/0015983 A1* | 1/2004 | Lemmons | 725/12 |
| 2004/0174326 A1 | 9/2004 | Yamamoto et al. | |
| 2004/0218532 A1* | 11/2004 | Khirman | 370/235 |
| 2006/0122842 A1* | 6/2006 | Herberger et al. | 704/278 |
| 2007/0126927 A1 | 6/2007 | Yun et al. | |
| 2008/0275906 A1* | 11/2008 | Rhoads et al. | 707/102 |

* cited by examiner

ENVIRONMENT INFORMATION PROVIDING METHOD, VIDEO APPARATUS AND VIDEO SYSTEM USING THE SAME

CROSS-REFERENCE TO RELATED APPLICATIONS

This application claims priority from Korean Patent Application No. 10-2007-0075586, filed on Jul. 27, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to providing environment information in a video apparatus and a video system. More particularly, apparatuses and methods consistent with the present invention relate to providing environment information relating to a video, a video apparatus and a video system using the method.

2. Description of the Related Art

With advances in the related art technology, the amount of information transmitted through information communication devices is getting large. Video apparatuses are advancing to provide various information, in addition to video information, to meet users' needs.

To respond to those trends, video apparatuses are evolving to provide audio visual information through the video information and information which stimulates five senses, such as the sense of smell and the sense of touch at the same time. Besides the audio visual information, environment information, which is sense information, can be provided from the video apparatus to a fragrance plug-in and an air conditioner and then forwarded to the user.

Generally, the video information being compressed is provided to the video apparatus and the compressed video information combines video packets and audio packets.

Accordingly, in terms of the compatibility, a method for providing the environment information using a video stream (for example, transport stream (TS) and program stream (PS)) currently in use is required.

When viewing the video, the user wants a more real atmosphere. Therefore, what is needed is a method for providing the same environment as in the reproduced video to the user.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an environment information providing method for inserting environment information to a video stream, a video apparatus and a video system using the same so as into provide the same environment as in a video being reproduced to a user.

According to an aspect of the present invention, an environment information providing method comprises extracting environment information from a video stream including the environment information; generating a control signal to control an external device according to the environment information; and sending the control signal to the external device.

The environment information may comprise at least one of temperature information, wind information, and fragrance information.

The environment information may be inserted in between packets of the video stream.

The external device may be at least one of a temperature control device, a wind control device, and a fragrance generator.

According to another aspect of the present invention, a video apparatus comprises a processor which extracts environment information from a video stream including the environment information; a controller which generates a control signal to control an external device according to the environment information; and an interface which sends the control signal to the external device.

The environment information may comprise at least one of temperature information, wind information, and fragrance information.

The environment information may be inserted in between packets of the video stream.

The external device may be at least one of a temperature control device, a wind control device, and a fragrance generator.

According to another aspect of the present invention, a video system comprises an environment control device which produces an environment according to a received control signal; and a video apparatus which extracts environment information from a video stream including the environment information, generates a control signal to control the environment control device according to the environment information, and sends the control signal to the environment control device.

The environment control device may be at least one of a temperature control device, a wind control device, and a fragrance generator.

According to another aspect of the present invention, an environment information providing method comprises generating environment information; and inserting the environment information in between packets of a video stream.

The video stream may be a TS.

A packet of the video stream may contain at least one of video data and audio data.

The environment information may be environment information relating to a video produced by at least one packet following the inserted environment information.

The inserting operation may insert the environment information in between the packets of the video stream while the video stream being input is recorded to a storage medium.

The inserting operation may insert the environment information in between the packets of the video stream with respect to the video stream stored to a storage medium.

The environment information providing method may further comprise receiving environment information from a user. The generating operation may generate environment information input by the user.

The environment information may comprise at least one of temperature information, wind information, and fragrance information.

According to another aspect of the present invention, a video apparatus comprises a storage unit which stores a video stream; and a controller which generates environment information and inserts the environment information in between packets of the video stream.

The video stream may be a TS.

A packet of the video stream may contain at least one of video data and audio data.

The controller may insert the environment information in between packets of the video stream while the video stream being input is recorded to a storage medium.

The controller may insert the environment information in between packets of the video stream with respect to the video stream stored to a storage medium.

According to yet another aspect of the present invention, an environment information providing method comprises generating environment information; and inserting the environment information in a header area of a video stream.

The video stream may be a PS, and the header area may be a header area of the PS.

The environment information may comprise at least one of temperature information, wind information, and fragrance information.

According to yet another aspect of the present invention, a video apparatus comprises a storage which stores a video stream; and a controller which generates environment information and inserts the environment information in a header area of the video stream.

The video stream may be a PS, and the header area may be a header area of the PS.

According to still another aspect of the present invention, an environment information providing method comprises generating environment information; and storing the environment information as a separate file.

According to still another aspect of the present invention, a video apparatus comprises a controller which generates environment information; and a storage which stores the environment information as a separate file.

BRIEF DESCRIPTION OF THE DRAWING FIGURES

The above and other aspects of the present invention will be more apparent by describing certain exemplary embodiments of the present invention with reference to the accompanying drawings, in which.

DETAILED DESCRIPTION OF THE EXEMPLARY EMBODIMENTS

Figure 1:
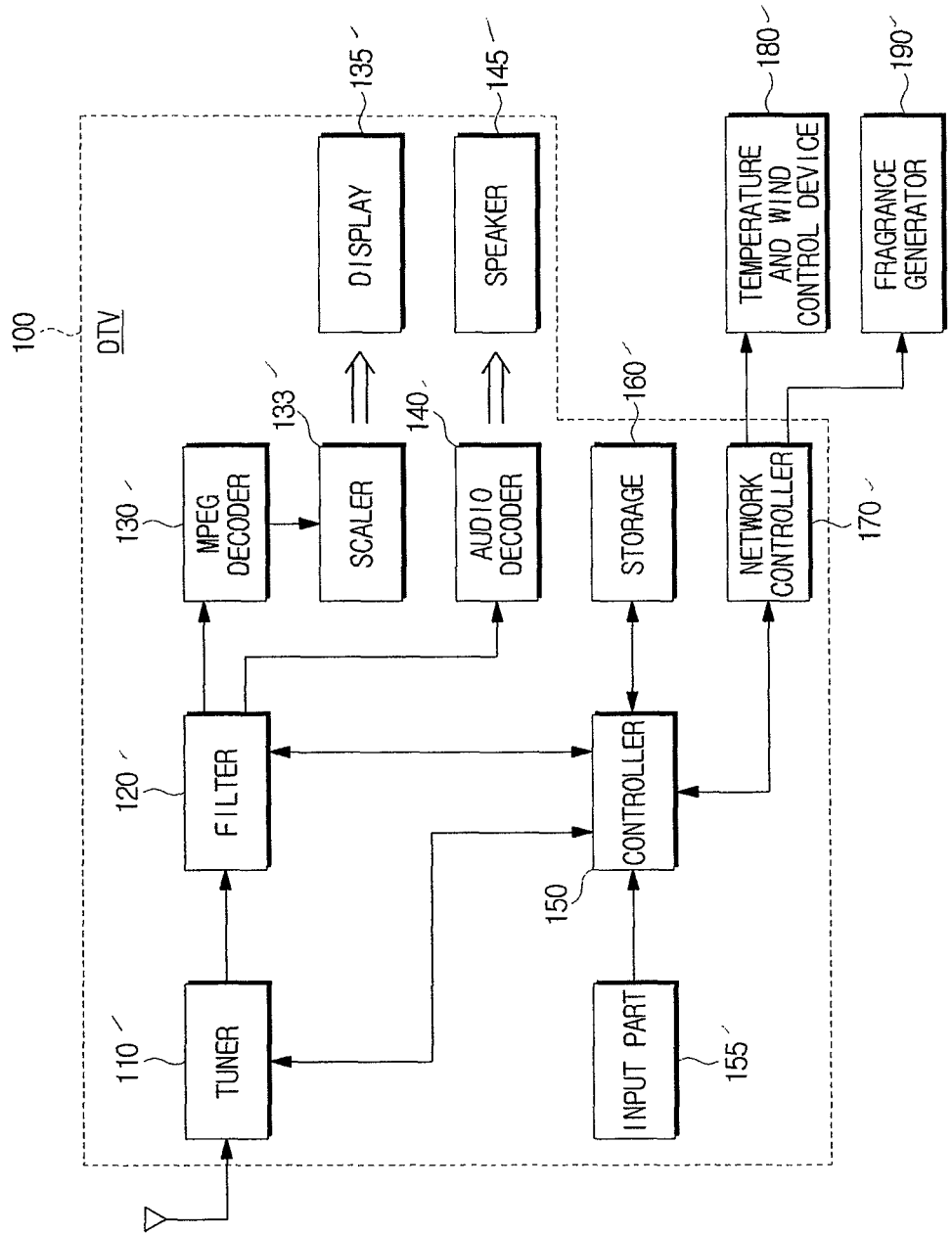
FIG. 1 is a block diagram of a digital television (DTV) to which an exemplary embodiment of the present invention is applicable.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a block diagram of a DTV to which the present invention is applicable. The DTV 100 of FIG. 1 comprises a tuner 110, a filter 120, a Moving Picture Experts Group (MPEG) decoder 130, a scaler 133, a display 135, an audio decoder 140, a speaker 145, a controller 150, an input part 155, a storage 160, a network controller 170, a temperature and wind control device 180, and a fragrance generator 190.

The tuner 110 receives and demodulates the broadcasting from a broadcasting station or a satellite by cable or by radio. The demodulated video is output as a video stream including at least one packet. The packets comprise video packets and audio packets.

The filter 120 splits the video stream into the video packets and the audio packets. Next, the filter 120 provides the video packets to the MPEG decoder 130 and provides the audio packets to the audio decoder 140. When the video stream comprises environment information, the filter 120 can provide the environment information to the controller 150.

The MPEG decoder 130 decodes the compression of the video packets. The scaler 133 scales the size of the screen constituted by the encoded video packets. The scaled video packets are fed to the display 135 and then displayed in a screen.

The audio decoder 140 decodes the compression of the audio packets. The speaker 145 receives the decoded audio packets and produces a sound.

The controller 150 controls overall operation of the DTV 100. Specifically, the controller 150 can control the DTV 100 to store the video stream received through the tuner 110 to the storage 160 right away. The controller 150 can control the DTV 100 to send the video stream stored in the storage 160 to the filter 120 and to display the video in the display 135.

The controller 150 can control the network controller 170 based on the environment information received from the filter 120. Hence, the controller 150 can control the temperature of the user's viewing room and generate wind and fragrance. For doing so, the environment information can comprise at least one of temperature information, wind information, and fragrance information.

The controller 150 can insert the environment information into the video stream. In more detail, the controller 150 can insert the environment information in between the packets of the video stream. For example, since the video stream of the TS is constituted by the packet unit, the controller 150 can insert the environment information in between the packets.

The controller 150 can insert and store the environment information in a header area of the video stream. For example, since the video stream of the PS is packs including a plurality of packets, the controller 150 can insert the environment information in the header area of the pack.

The controller 150 can control the DTV 100 to store the environment information as a file separately from the video stream. The environment information file contains information relating to the timing required by the environment information while the video stream is reproduced. The controller 150 reads the environment information at the timing required by the environment information by synchronizing with the reproduction time of the environment information file while the video stream is reproduced.

The controller 150 issues a control signal to control an external device according to the environment information.

For example, the controller 150 issues a control signal to control the fragrance generator 190 according to the fragrance information. Also, the controller 150 issues a control signal to control the temperature and wind control device 180 according to the temperature information and wind information.

The input part 155 receives and provides a user's control to the controller 150. The input part 155 may be an external input device such as remote controller or an internal input device such as key buttons in the DTV 100.

The input part 155 receives the environment information from the user and provides the received environment information to the controller 150. The user can select a menu for the environment information by manipulating the input part 155. The user can input the user's intended environment information through the input part 155 in the process of the recording or the reproduction.

The storage 160 stores the video stream. Generally, the video stream is stored as compressed. The compression scheme of the digital broadcasting video comprises the MPEG scheme. The video stream comprises the TS and the PS. The TS is the video stream including packets of a constant size. The PS is the stream constituted by packs including video packets and audio packets.

The network controller 170 is an interface which distinguishes the signals to be sent to the external device connected to the DTV 100. For example, the network controller 170 transmits the control signal according to the temperature information and the wind information of the environment information to the temperature and wind control device 180. The network controller 170 transmits the control signal according to the fragrance information to the fragrance generator 190.

The temperature and wind control device 180 is one of environment control devices which regulate the temperature and the wind in the viewing room based on the environment information received from the DTV 100. For instance, to set the wintry scenery as the background of the video, the temperature and wind control device 180 can produce the wintry atmosphere by lowering the temperature in the viewing room and blowing air at an increased rate.

The fragrance generator 190 is one of the environment control devices which regulate the fragrance in the viewing room based on the environment information received from the DTV 100. For example, when the video of the fruits is reproduced, the fragrance generator 190 can produce the fragrance of the fruits as if fruits are placed in the viewing room.

Figure 2:
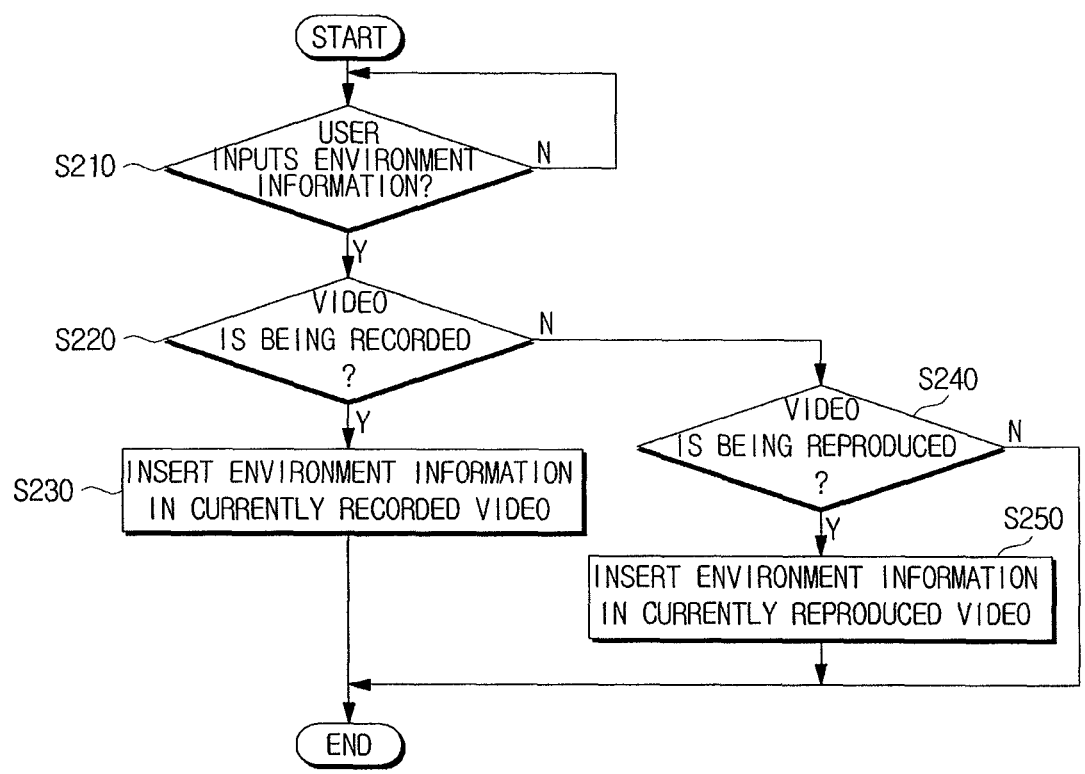
FIG. 2 is a flowchart outlining an environment information providing method according to an exemplary embodiment of the present invention.

Now, how the user inputs the environment information is described in detail by referring to FIG. 2. FIG. 2 is a flowchart outlining an environment information providing method according to an exemplary embodiment of the present invention.

In FIG. 2, the controller 150 determines whether the user inputs the environment information through the input part 155 (S210). When the user inputs the environment information (S210-Y), the controller 150 determines whether the video is being recorded (S220).

When the video is being recorded (S220-Y), the controller 150 inserts the environment information into the recorded video (S230). In more detail, to input the environment information, the controller 150 separately generates a valid signal. The valid signal is usually set to '1'. At the point when the user inputs the environment information, the valid signal becomes '0'. Hence, the controller 150 inserts the environment information when the valid signal is '0'.

In doing so, when the video stream is the TS, the controller 150 inserts the environment information in between the packets of the video stream. When the video stream is the PS, the controller 150 inserts the environment information in the header area of the video stream. The video stream with the inserted environment information is stored to the storage 160. To store the environment information as a separate file, the controller 150 stores the current time point of the video and the environment information in a separate file.

The inserted environment information is the environment information relating to the video represented by at least one packet following the inserted environment information. That is, the currently input environment information signifies the environment information from the time point of the input environment information to the time point of new environment information.

By adding time information for maintaining the environment corresponding to the environment information, the user may define its holding time. The user may input an environment information execution cancel command through the input part 155.

When the video stream with the input environment information is reproduced, an interrogation message enabling the user to determine whether to execute the environment information may be displayed.

By contrast, when the video is not recorded (S220-N), the controller 150 determines whether the video is being reproduced (S240). When the video is being reproduced (S240-Y), the controller 150 inserts the environment information into the currently reproduced video (S250). Likewise, the environment information is inserted to the video stream as described above.

As above, the user can insert the user's intended environment information in the process of the video recording or the video reproduction by way of example. Note that the environment information can be inserted using other methods.

For instance, even when the video stream is not recorded or reproduced, the user can add the environment information by editing the stored video stream. In addition, the broadcasting signal from the broadcasting station may carry the video signal including the environment information.

Figure 3:
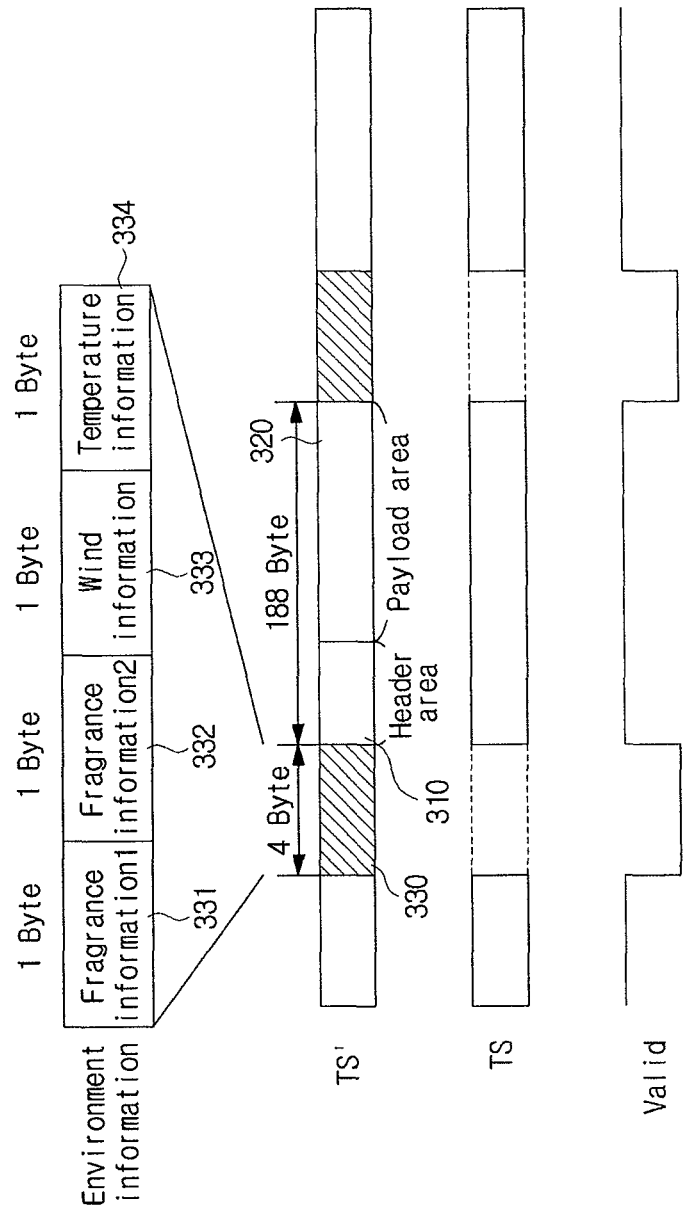
FIG. 3 illustrates the insertion of the environment information into a transport stream (TS) of the video stream.
Figure 4:
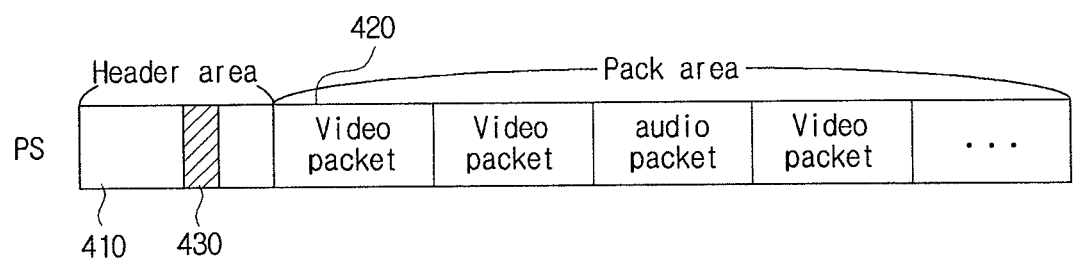
FIG. 4 illustrates the insertion of the environment information into a PS of the video stream.

Hereafter, the format of the video stream including the environment information according to an exemplary embodiment of the present invention is explained in detail by referring to FIGS. 3 and 4. FIG. 3 illustrates the insertion of the environment information into the TS of the video stream, according to an exemplary embodiment of the present invention.

The TS of FIG. 3 comprises a plurality of packets. One packet comprises a header area 310 and a payload area 320. The header area 310 contains a packet identifier (PID) for distinguishing the type of the packet, a continuity counter indicative of the order of the packet, and so forth. The payload area 320 contains video data or audio data. The video data or the audio data is in a form of a packetized elementary stream (PES) packet.

The packet constituting the TS consists of 188 bytes. Since the packets of the constant size constitute the TS, it is possible to insert the environment information in between the packets.

In FIG. 3, TS is before the insertion of the environment information 330 and TS' is after the insertion of the environment information 330. The controller 150 inserts the environment information 330 when the valid signal is '0' as shown in FIG. 3. When the user inputs an environment information input command through the input part 155, the valid signal becomes '0'.

The environment information 330 comprises fragrance information1 331, fragrance information2 332, wind information 333, and temperature information 334, each of which is one byte in size. Accordingly, the environment information 330 comprises four bytes. Since the fragrance information 331 and 332 have two-submenus, two bytes are assigned to each.

The size of the information is not limited to one byte, and the size of the environment information 330 may vary. For example, when the type of the wind information 333 is multiple, two bytes can be allocated to the wind information. While the size of the environment information is four bytes, more or less bytes can be allocated.

While the environment information comprises the fragrance information, the wind information, and the temperature information by way of example, the environment information can comprise other information. For example, the environment information may comprise humidity information, luminance information, and so on.

FIG. 4 illustrates the insertion of the environment information to the PS of the video stream, according to an exemplary embodiment of the present invention.

The PS of FIG. 4 is the flow of packs including a header area 410 and a pack area 420. In general, the PS can be considered as the bunch of video packets and audio packets for one program.

The header area 410 carries basic information of the packet (e.g., start code and system header). The controller 150 may insert the environment information 430 in the header area 410 of the PS. In this case, the header area 410 needs to carry information relating to the time point of the insertion of the environment information 430. The information relating to the time point of the inserted environment information 430 can be stored as an address value of the packet, an index value of the packet, or a reproduction time value of the insertion.

The pack area 420 carries video packets and audio packets of the program.

So far, the format of the video stream including the environment information has been illustrated in detail by referring to FIGS. 3 and 4.

While the video stream is the TS and the PS by way of example, the environment information can be inserted to other video streams.

The present information is applicable to the method for inserting the environment information not only into the video stream but also into a separate file. In this case, the environment information file contains the type of the environment information and the time point of the execution of the corresponding environment information.

Figure 5:
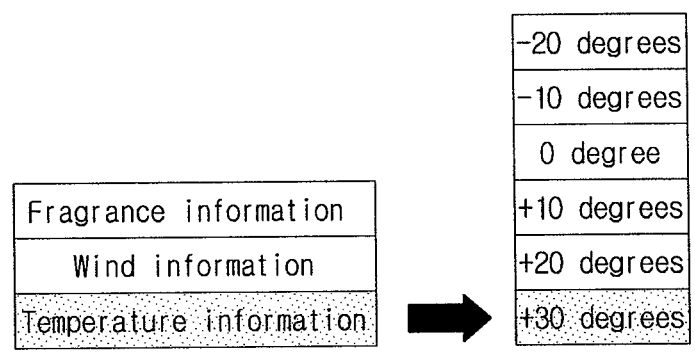
FIG. 5 illustrates a temperature information setup menu according to an exemplary embodiment of the present invention.
Figure 6:
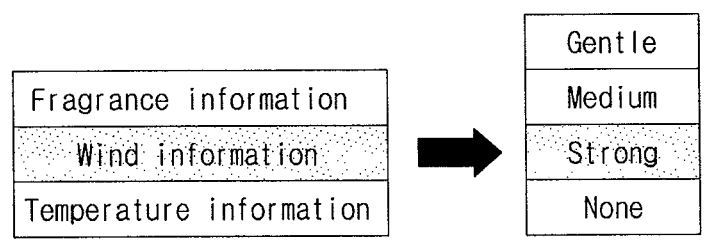
FIG. 6 illustrates a wind information setup menu according to an exemplary embodiment of the present invention.
Figure 7:
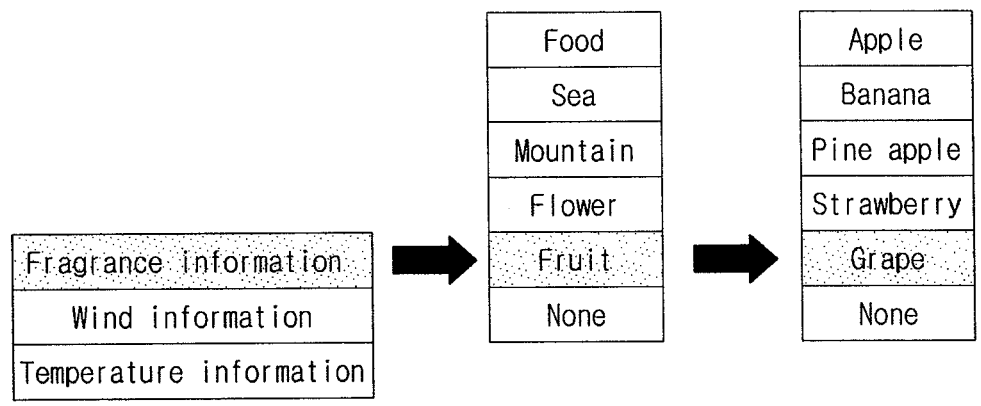
FIG. 7 illustrates a fragrance information setup menu according to an exemplary embodiment of the present invention.

The environment information setup menu is now described by referring to FIGS. 5, 6 and 7. FIG. 5 illustrates a temperature information setup menu according to an exemplary embodiment of the present invention.

The user can select a submenu for the temperature +30 degrees~−20 degrees to set the temperature information as shown in FIG. 5. The submenu is constituted to select the temperature by 10 degrees.

When the user initiates an environment information input mode by manipulating the input part 155, the menu of "Fragrance information", "Wind information", and "Temperature information" is displayed. When the user selects "Temperature information", the submenu of the temperature information to be set is displayed in the screen. When the user selects one of the temperatures −20 degrees~+30 degrees, the temperature and wind control device 180 regulates the temperature of the viewing room to the selected temperature.

While the temperature is selected by 10 degrees for example, the temperature information can be selected in other manners. For example, the temperature can be selected by 1 degree. Also, the user may manually input the temperature value using number buttons of the input part 155.

FIG. 6 illustrates a wind information setup menu according to an exemplary embodiment of the present invention. The wind information in FIG. 6 comprises a submenu which has four items of gentle, medium, strong, and none.

Note that the wind information may comprise other types. For example, the wind information may comprise a natural wind and a changing wind.

FIG. 7 illustrates a fragrance information setup menu according to an exemplary embodiment of the present invention. The fragrance information of FIG. 7 comprises a two-step submenu. Hence, the fragrance information is 2 bytes in size.

When the user selects "Fragrance information", the DTV 100 displays the submenu of the fragrance information. When the user selects "Fruit" in the submenu of the fragrance information, the submenu of "Fruit" is displayed in the screen. For example, the submenu of "Fruit" can comprise Apple, Banana, Pine apple, Strawberry, Grape, and so forth.

So far, the environment information setup menus have been explained in detail by referring to FIGS. 5, 6 and 7. As indicated above, the user can insert the environment information to the recorded or reproduced video using the environment information setup menus.

While the video stream with the inserted environment information is stored to the storage 160, the video stream can be transmitted and stored to other medium. For example, the video stream with the inserted environment information can be transmitted to an external device being connected by cable or by radio. The video stream with the inserted environment information can be recorded to a portable recording medium and then transferred to an external device.

While the environment information is inserted into the video stream by the user at the DTV 100, the DTV 100 may receive the video stream with the inserted environment information from an external device. For example, the DTV 100 may receive a broadcasting signal of the video stream with the inserted environment information through the tuner 110.

While the DTV is illustrated by way of example, the present invention is applicable to various video apparatuses, which comprise television (TV), digital video disc (DVD) player, hard disk drive (HDD) player, Blu-ray disk (BD) player, video cassette recorder (VCR), and home cinema system.

As set forth above, according to the environment information providing method for inserting the environment information into the video stream and the video apparatus using the same, the user can watch the video in the same environment as in the reproduced video.

Particularly, using the data relating to the environment information in addition to the video packets and the audio packets, the user can experience the fragrance, the temperature and the wind similar to the environment represented in the video.

Further, by adding the environment information to the existing video stream, the video stream with the environment information can be compatible with the existing video stream.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An environment information providing method comprising:
   storing a video stream in a storage unit;
   extracting environment information from the video stream;
   generating a control signal to control an external device according to the environment information;
   sending the control signal to the external device; and
   controlling the external device according to the control signal to produce an environment relating to the video stream based on the environment information;
   wherein the environment information corresponds to at least one packet following the environment information; and
   wherein the storing comprises inserting the environment information in between two packets of a plurality of packets of the video stream while the video stream is being stored in the storage unit.

2. The environment information providing method of claim 1, wherein the environment information comprises at least one of temperature information, wind information, and fragrance information.

3. The environment information providing method of claim 1, wherein the external device is at least one of a temperature control device, a wind control device, and a fragrance generator.

4. A video apparatus comprising:
   a storage unit which stores a video stream;
   a processor which extracts environment information from the video stream;
   a controller which generates a control signal to control an external device to produce an environment relating to the video stream according to the environment information; and
   an interface which sends the control signal to the external device;
   wherein the environment information corresponds to at least one packet following the environment information;
   wherein, while the video stream is being stored in the storage unit, the environment information is inserted in between two packets of a plurality of packets of the video stream.

5. The video apparatus of claim 4, wherein the environment information comprises at least one of temperature information, wind information, and fragrance information.

6. The video apparatus of claim 4, wherein the external device is at least one of a temperature control device, a wind control device, and a fragrance generator.

7. An environment information providing method comprising:
   generating environment information;
   inserting the environment information in between two packets of a plurality of packets of a video stream; and
   controlling an external device to produce an environment relating to the video stream based on the environment information;
   wherein the environment information corresponds to at least one packet following the environment information;
   wherein the inserting comprises inserting the environment information in between the two packets of the plurality of packets of the video stream while the video stream being input is recorded to a physical storage medium.

8. The environment information providing method of claim 7, wherein the video stream is a transport stream.

9. The environment information providing method of claim 7, wherein at least one packet of the plurality of packets contains either video data or audio data.

10. The environment information providing method of claim 7, further comprising:
    receiving input information from a user,
    wherein the generating comprises generating environment information corresponding to the input information.

11. The environment information providing method of claim 7, wherein the environment information comprises at least one of temperature information, wind information, and fragrance information.

12. A video apparatus comprising:
    a storage unit which stores a video stream; and
    a controller which generates environment information, inserts the environment information in between two packets of a plurality of packets of the video stream while the video stream is being stored in the storage unit, and controls an external device to produce an environment relating to the video stream according to the environment information;
    wherein the environment information corresponds to at least one packet following the environment information.

13. The video apparatus of claim 12, wherein the video stream is a transport stream.

14. The video apparatus of claim 12, wherein at least one packet of the plurality of packets of the video stream contains either video data or audio data.

15. A video system comprising:
    an environment control device which produces an environment according to a received control signal;
    a storage unit which stores a video stream; and
    a video apparatus which extracts environment information from the video stream, generates the control signal to control the environment control device to produce an environment according to the environment information, and sends the control signal to the environment control device;
    wherein the environment information corresponds to at least one packet following the environment information;
    wherein, while the video stream is being stored in the storage unit, the environment information is inserted in between two packets of a plurality of packets of the video stream.

16. The video system of claim 15, wherein the environment control device comprises at least one of a temperature control device, a wind control device, and a fragrance generator.

* * * * *